United States Patent
Teng et al.

(10) Patent No.: US 10,612,634 B2
(45) Date of Patent: Apr. 7, 2020

(54) DUSTPROOF DEVICE FOR BALL SCREW

(71) Applicant: HIWIN TECHNOLOGIES CORP., Taichung (TW)

(72) Inventors: Hong-Chun Teng, Taichung (TW); Szu-Wei Yu, Taichung (TW); Wei-Lun Liu, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 60 days.

(21) Appl. No.: 15/874,218

(22) Filed: Jan. 18, 2018

(65) Prior Publication Data
US 2018/0142767 A1 May 24, 2018

Related U.S. Application Data (63) Continuation-in-part of application No. 15/074,727, filed on Mar. 18, 2016, now abandoned.

(51) Int. Cl.
*F16H 25/24* (2006.01)
*F16J 15/06* (2006.01)
*F16H 25/22* (2006.01)

(52) U.S. Cl.
CPC ..... *F16H 25/2418* (2013.01); *F16H 25/2204* (2013.01); *F16J 15/06* (2013.01)

(58) Field of Classification Search
CPC ............. F16H 25/2418; F16H 25/2204; F16H 25/2238; F16H 2025/2276; F16H 2025/228
See application file for complete search history.

(56) References Cited

U.S. PATENT DOCUMENTS

| 5,231,888 | A | 8/1993 | Katahira | |
| 6,578,852 | B2* | 6/2003 | Nakagawa | F16H 25/2418 |
| | | | | 277/549 |
| 6,732,599 | B2 | 5/2004 | Michioka et al. | |
| 8,261,627 | B2* | 9/2012 | Miyahara | F16H 25/2219 |
| | | | | 74/424.82 |
| 2002/0062705 | A1* | 5/2002 | Michioka | F16H 25/2418 |
| | | | | 74/424.82 |

(Continued)

FOREIGN PATENT DOCUMENTS

| CN | 203146737 U | 8/2013 |
| CN | 204239652 U | 4/2015 |

(Continued)

*Primary Examiner* — Zakaria Elahmadi
(74) *Attorney, Agent, or Firm* — Muncy, Geissler, Olds & Lowe, P.C.

(57) ABSTRACT

A dustproof device is provided for use with a ball screw which includes a screw rod and a nut mounted around the screw rod. The dustproof device includes an annular body and an elastic valve plate. The annular body is disposed inside the nut and penetrated by the screw rod and has an outer annular surface provided with a debris exit. The debris exit has one end in communication with a spiral passage formed between the screw rod and the nut. The elastic valve plate, which is provided at the opposite end of the debris exit of the annular body, can be pushed open by a fluid and thus opens the debris exit, allowing the debris generated by the ball screw to be discharged through the debris exit along with the fluid, thereby contributing to extending the service life of the ball screw.

2 Claims, 10 Drawing Sheets

(56) References Cited

U.S. PATENT DOCUMENTS

| | | | | |
|---|---|---|---|---|
| 2004/0211280 | A1* | 10/2004 | Nishimura | F16C 33/3706 74/424.82 |
| 2008/0250887 | A1* | 10/2008 | Harada | F16H 25/2223 74/424.82 |
| 2009/0095099 | A1* | 4/2009 | Konomoto | F15B 15/068 74/89.35 |
| 2009/0293658 | A1* | 12/2009 | Michioka | F16H 25/2219 74/424.87 |
| 2010/0307271 | A1* | 12/2010 | Hsu | F16H 25/2219 74/424.82 |
| 2011/0113905 | A1* | 5/2011 | Dietz | F16H 25/20 74/89.44 |
| 2012/0060631 | A1* | 3/2012 | Hsieh | F16H 25/2204 74/89.4 |
| 2013/0255419 | A1* | 10/2013 | Iida | F16H 25/2418 74/424.81 |
| 2014/0013887 | A1* | 1/2014 | Chang | F16H 57/0406 74/424.82 |
| 2014/0352470 | A1* | 12/2014 | Hsieh | F16H 25/2418 74/424.82 |
| 2015/0114156 | A1* | 4/2015 | Ishizaki | F16H 25/2418 74/424.82 |
| 2015/0233454 | A1* | 8/2015 | Jiang | F16H 25/2418 74/424.82 |
| 2016/0238114 | A1* | 8/2016 | Oka | F16H 25/2418 |

FOREIGN PATENT DOCUMENTS

| | | |
|---|---|---|
| DE | 3641682 A1 | 6/1988 |
| JP | H5-79122 U | 10/1993 |
| JP | H10-2396 A | 1/1998 |
| JP | 2009-264566 A | 11/2009 |
| JP | 2011-133049 A | 7/2011 |
| JP | 2011-247404 A | 12/2011 |
| JP | 4967809 B2 | 7/2012 |
| JP | 2013-119922 A | 6/2013 |
| JP | 2013-245798 A | 12/2013 |
| TW | 201315914 A1 | 4/2013 |
| TW | M489936 U | 11/2014 |

* cited by examiner

FIG. 14

DUSTPROOF DEVICE FOR BALL SCREW

CROSS-REFERENCE TO RELATED APPLICATION

This application is a continuation-in-part of U.S. patent application Ser. No. 15/074,727, filed Mar. 18, 2016.

BACKGROUND OF THE INVENTION

1. Technical Field

The present invention relates to ball screws and more particularly to a dustproof device for a ball screw.

2. Description of Related Art

When a ball screw is in operation, the rolling contact between the screw rod, the nut, and the balls causes abrasion and hence the generation of debris, or dust. If the debris remaining in the gap between the screw rod and the nut is not removed, the precision of transmission and the smoothness of operation of the ball screw will be compromised, and the service life of the ball screw will be shortened as a result. U.S. Pat. No. 5,231,888 discloses sucking internally generated debris with a suction device, and yet the suction device adds to the complexity of the entire structure and to the installation cost. Japanese Patent No. 4967809 uses a magnet to increase the closeness between the lip of a dustproof device and a screw rod, but debris tends to be attracted into and subsequently accumulate in the spiral groove of the screw rod. That is to say, the magnet, though contributing to an enhanced sealing effect, indirectly increases the operating resistance of the whole structure.

SUMMARY OF THE INVENTION

The primary objective of the present invention is to provide a dustproof device applicable to a ball screw and featuring structural simplicity, a good sealing effect, and effectiveness in removing the debris between the nut and the screw rod of a ball screw so as to extend the service life of the ball screw.

To achieve the above objective, a first dustproof device provided by the present invention includes an annular body and an elastic valve plate. The annular body is disposed inside a nut and penetrated by a screw rod. The annular body has an inner annular surface provided with a dustproof lip abutting against the periphery of the screw rod. The annular body further has an outer annular surface provided with at least one debris exit, a first lateral surface, and a second lateral surface. The debris exit is communicated with the first lateral surface to form a first opening and communicated with the second lateral surface to from a second opening. The debris exit is communicated with a spiral passage formed between the nut and the screw rod via the first opening. The elastic valve plate is connected to the annular body and blocks over the second opening.

When subjected to the pressure of a fluid, the elastic valve plate opens the debris exit, allowing debris to flow out with the fluid through the debris exit. Once the pressure of the fluid is removed, the elastic valve plate closes the debris exit thanks to the elastic restoring force of the elastic valve plate itself.

A second dustproof device provided by the present invention has an annular body disposed inside the nut and penetrated by the screw rod. The annular body has an inner annular surface provided with a dustproof lip abutting against the periphery of the screw rod, an outer annular surface, a first lateral surface, and a second lateral surface provided with a debris exit communicated with the spiral passage via a pore that penetrates through the first lateral surface. When a fluid reaches the dustproof device via the spiral passage, the pressure of the fluid pushes and expands the pore so that debris can flow out of the debris exit through the pore along with the fluid. As soon as the pressure of the fluid is removed, the pore restores its original diameter or shape.

DETAILED DESCRIPTION OF THE INVENTION

Figure 1:
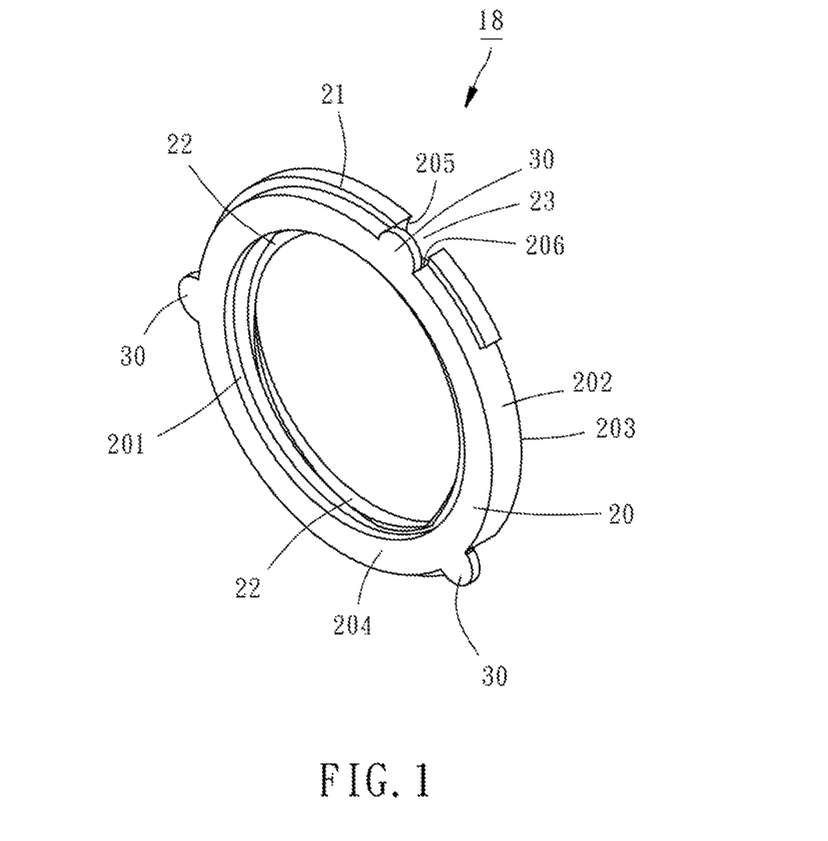
FIG. 1 is a perspective view of the first embodiment of the present invention.
Figure 2:
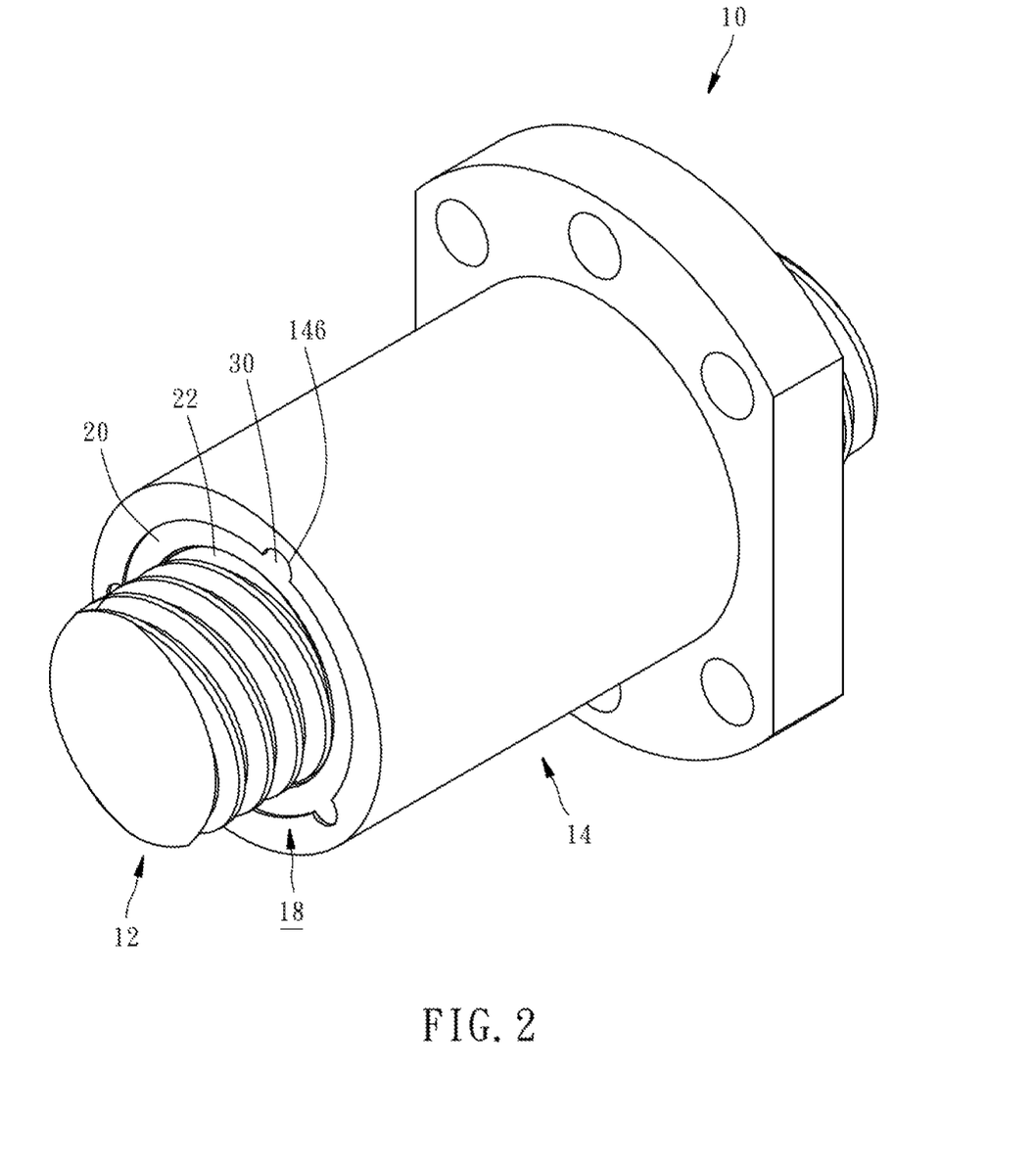
FIG. 2 is a perspective view of the first embodiment of the present invention applied to a ball screw.
Figure 3:
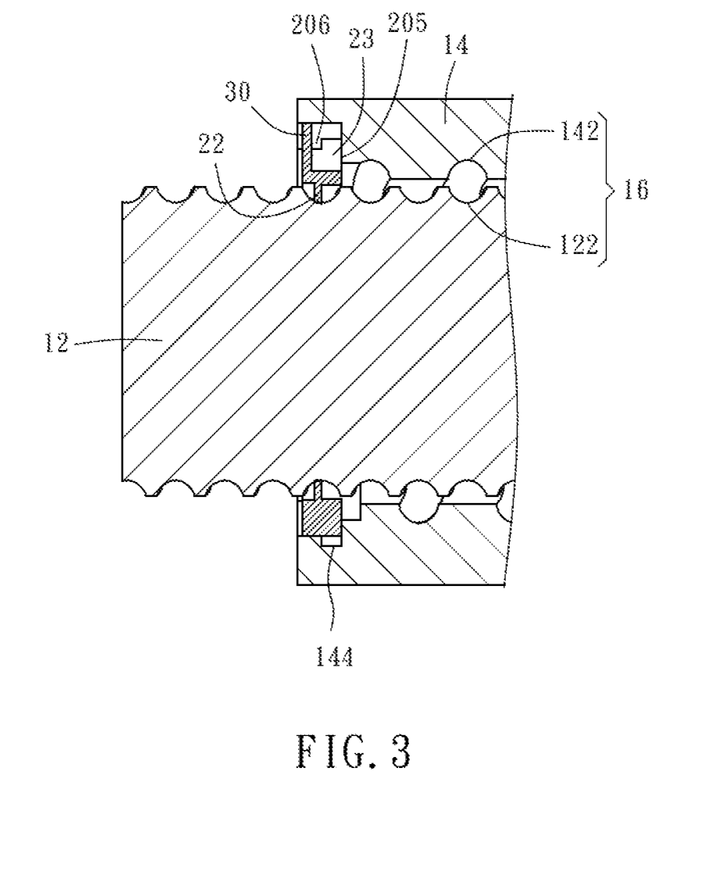
FIG. 3 is a sectional view of the first embodiment of the present invention applied to a ball screw, showing in particular the debris exit in the closed state.

Referring to FIG. 2 and FIG. 3, the ball screw 10 in the drawings includes a screw rod 12, a nut 14 mounted around the screw rod 12, and a plurality of balls (not shown) provided between the screw rod 12 and the nut 14. The screw rod 12 is peripherally provided with an external spiral groove 122. The nut 14 has an inner periphery provided with an internal spiral groove 142. The external spiral groove 122 of the screw rod 12 and the internal spiral groove 142 of the nut 14 correspond to each other and jointly form a spiral passage 16 in and along which the balls can circulate. Referring to FIG. 1, the dustproof device 18 of the present invention includes an annular body 20 and three elastic valve plates 30.

The annular body 20 has an inner annular surface 201, an outer annular surface 202, a first lateral surface 203, a second lateral 204, two corresponding positioning flanges 21 on the outer annular surface 202, and two corresponding dustproof lips 22 on the inner annular surface 201. To assemble, the screw rod 12 is inserted through the annular body 20 until the positioning flanges 21 are engaged in the positioning groove 144 in the inner periphery of the nut 14. After assembly, the dustproof lips 22 of the annular body 20 abut against the periphery of the screw rod 12 to produce a sealing effect, preventing foreign matters from entering the gap between the screw rod 12 and the nut 14. In addition, three debris exits 23 are arranged along the outer annular surface 202 of the annular body 20. Each debris exit 23 is communicated with the first lateral surface 203 to form a first opening 205 and communicated with the second lateral surface 204 to form a second opening 206. Each debris exit 23 is communicated with the spiral passage 16 via the first opening 205.

Each elastic valve plate 30 is connected with the annular body 20 and blocks over the second opening 206 of a respective debris exit 23. In this embodiment, the inner periphery of the nut 14 has three valve plate grooves 146 adjacent to the positioning groove 144. After assembly, the elastic valve plates 30, each having an end connected to the outer annular surface 202 of the annular body 20, are located in the valve plate grooves 146 of the nut 14 respectively and block over the debris exits 23 respectively.

Figure 4:
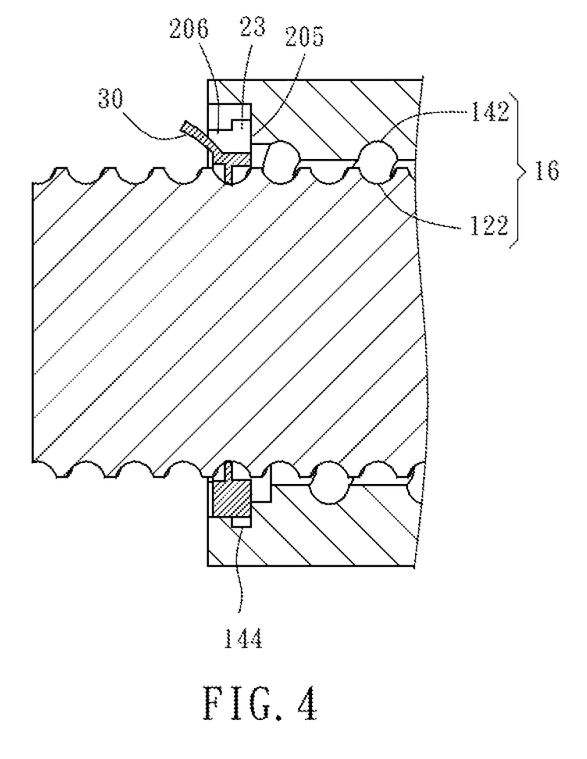
FIG. 4 is a sectional view of the first embodiment of the present invention applied to a ball screw, showing in particular the debris exit in the open state.

According to the above, a fluid (e.g., grease) injected into the nut 14 can carry debris along the spiral passage 16 to the debris exits 23, where the fluid applies an outward pushing force to the elastic valve plates 30. The pressure of the fluid pushes the elastic valve plates 30 to swing outwardly so as to open the second openings 206 of the debris exits 23, as shown in FIG. 4, such that the debris is discharged together with the fluid through the second openings 206 of the debris exits 23. Once injection of the fluid is stopped, the pushing force applied by the fluid to the elastic valve plates 30 is removed, and the elastic valve plates 30 are driven by their inherent elastic restoring force to return to their initial positions so as to close the second openings 206 of the debris exits 23 respectively, as shown in FIG. 3.

Figure 5:
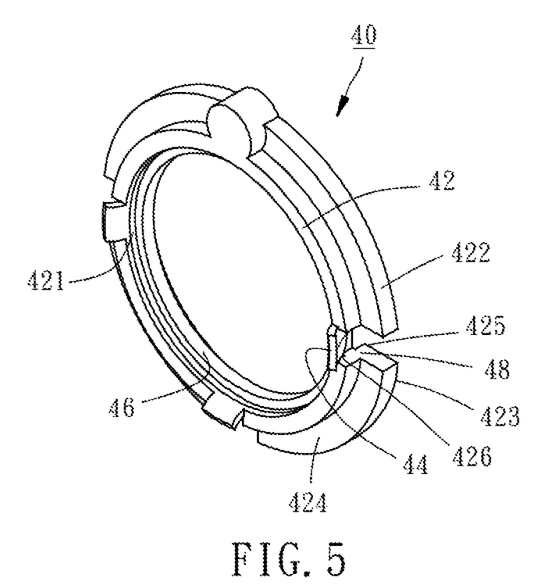
FIG. 5 is a perspective view of the second embodiment of the present invention.

Referring to FIG. 5, a dustproof device 40 according to a second embodiment of the present invention comprises an annular body 42 and three elastic valve plates 44. The annular body 42 has an inner annular surface 421, an outer annular surface 422, a first lateral surface 423, and a second lateral 424. Further, the annular body 42 is provided at the outer annular surface 422 thereof with three debris exits 48, each of which is communicated with the first lateral surface 423 to form a first opening 425 and communicated with the second lateral surface 424 to form a second opening 426. Each debris exit 48 is in communication with the spiral passage 16 via the first opening 425.

Figure 6:
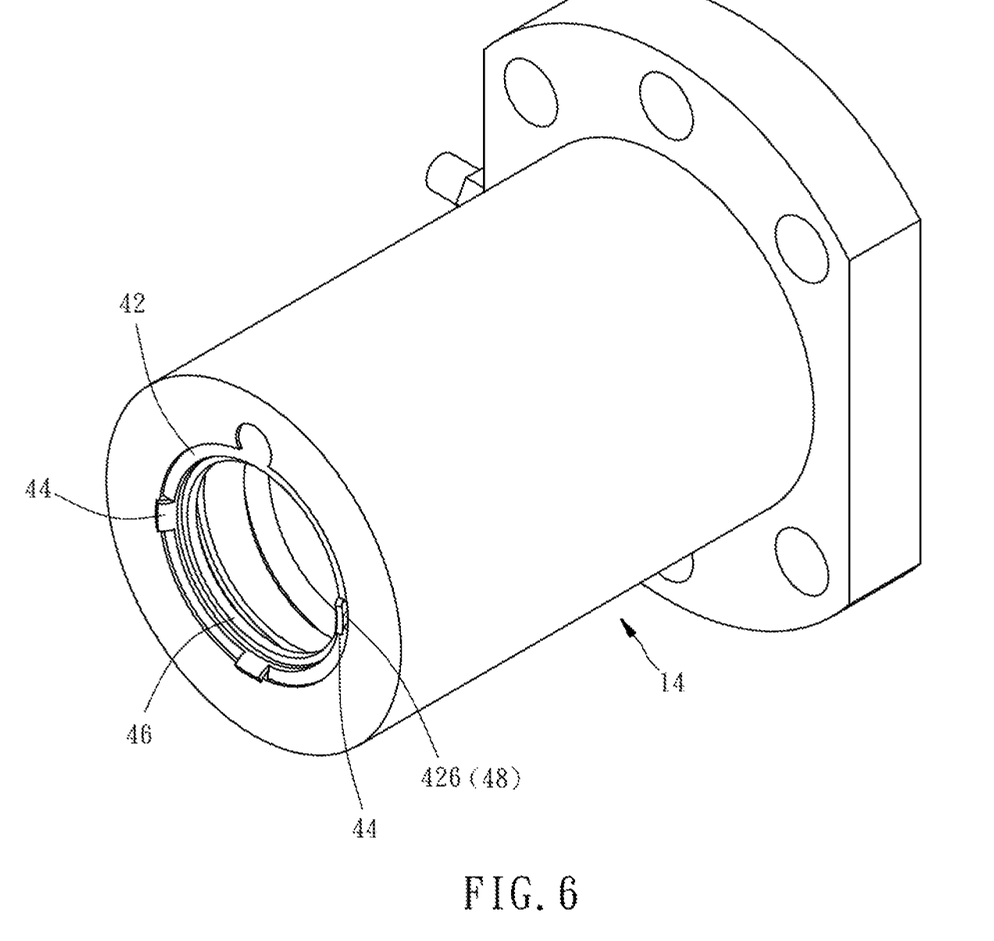
FIG. 6 is a perspective view of the second embodiment of the present invention applied to a nut.
Figure 7:
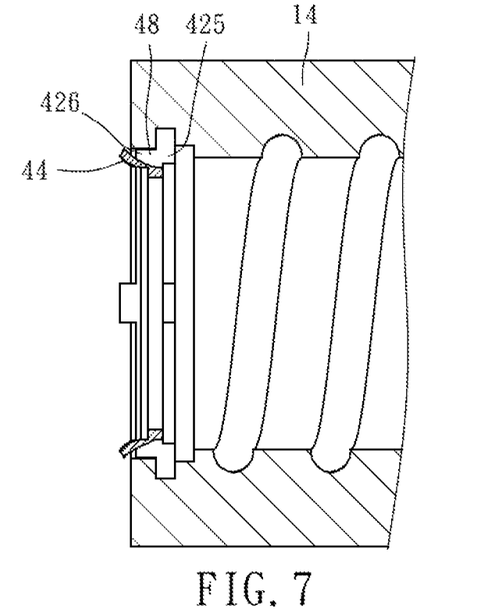
FIG. 7 is a sectional view of the second embodiment of the present invention applied to a nut, showing in particular the debris exit in the open state.
Figure 8:
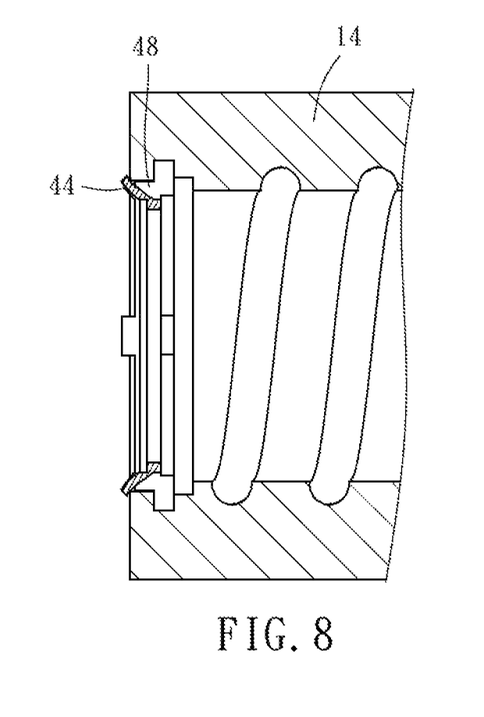
FIG. 8 is a sectional view of the second embodiment of the present invention applied to a nut, showing in particular the debris exit in the closed state.

The second embodiment is different from the first embodiment in that each elastic valve plate 44 has one end connected to the inner annular surface 421 of the annular body 42 and an opposite end extending in a direction away from the dustproof lip 46 and abutting against an end surface of the nut 14. Thus, referring to FIGS. 6-8, the elastic valve plates 44 open the debris exits 48 respectively when subjected to the pressure of a fluid and pushed away from the second openings 426, allowing debris to flow out of the debris exits 48 along with the fluid. When the pressure of the fluid is removed, the elastic valve plates 44 block over the second openings 426 to close the debris exits 48 respectively as a result of the elastic restoring force of the elastic valve plates 44.

Figure 9:
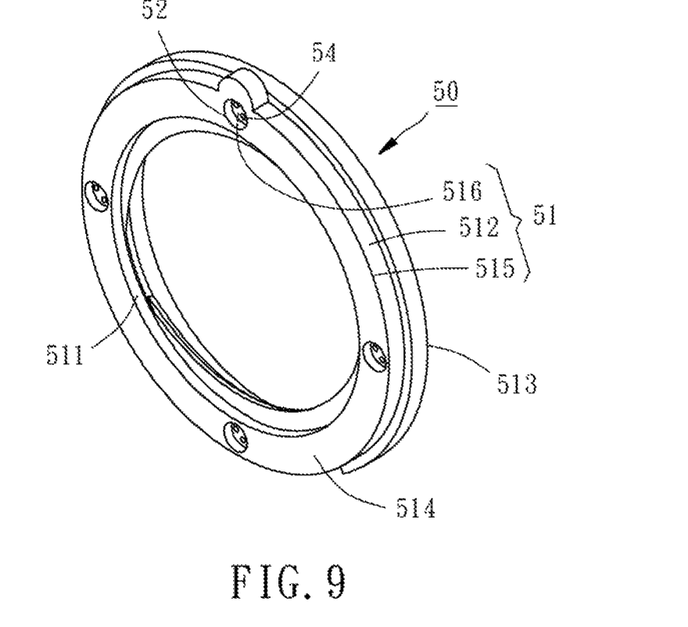
FIG. 9 is a perspective view of the third embodiment of the present invention.
Figure 10:
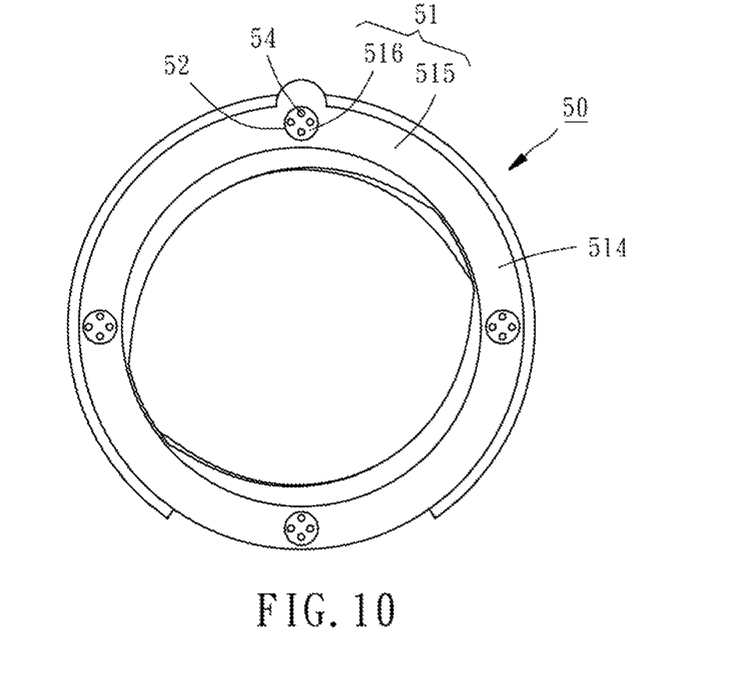
FIG. 10 is a front view of the third embodiment of the present invention.
Figure 11:
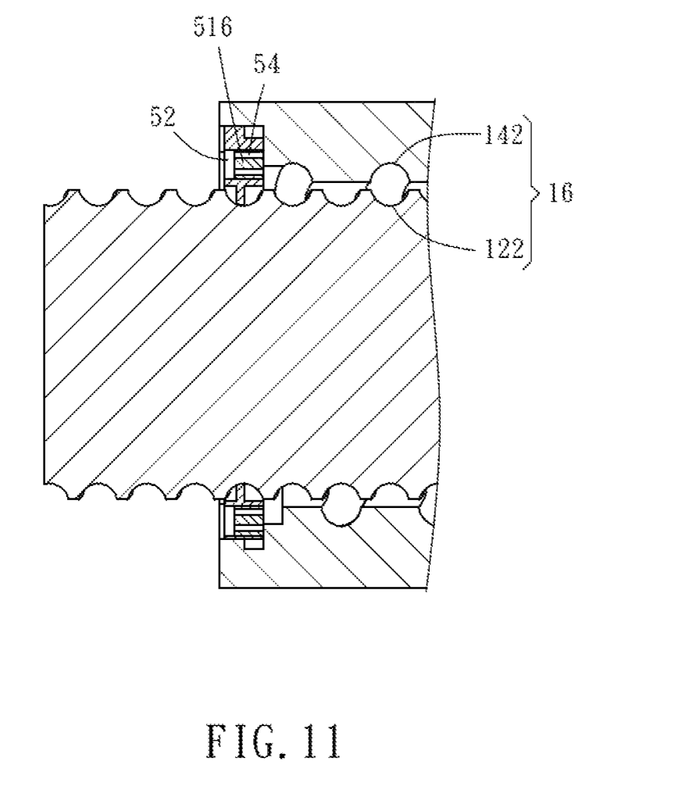
FIG. 11 is a sectional view of the third embodiment of the present invention applied to a ball screw.
Figure 12:
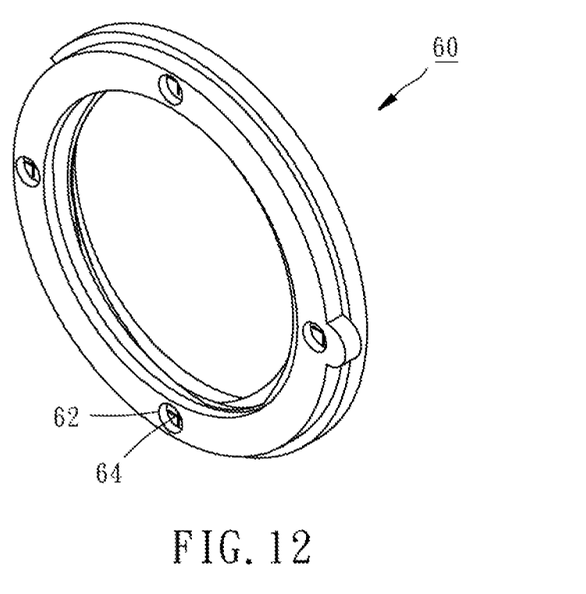
FIG. 12 is a perspective view of the fourth embodiment of the present invention.
Figure 13:
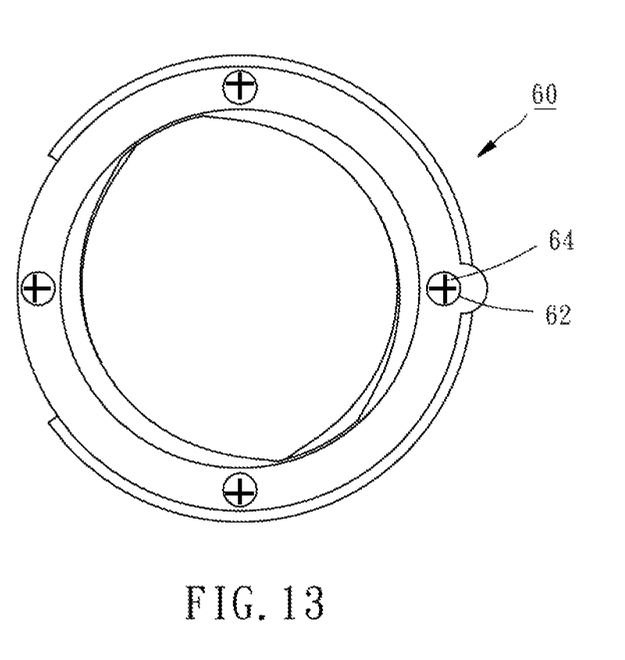
FIG. 13 is a front view of the fourth embodiment of the present invention.
Figure 14:
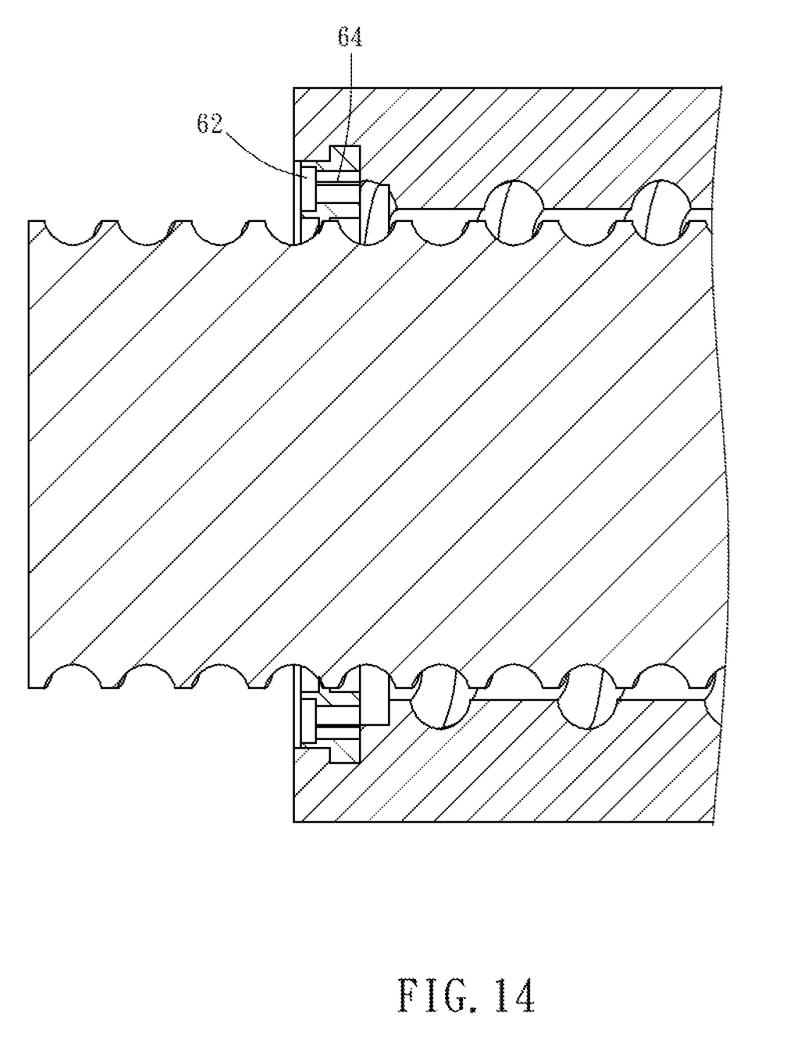
FIG. 14 is a sectional view of the fourth embodiment of the present invention applied to a ball screw.

It is worth mentioning that the elastic valve plates are not essential to the dustproof device. Referring to FIG. 9 and FIG. 10 for a third embodiment of the present invention, the dustproof device 50 comprises an annular body 51 made of an elastic material such as rubber. The annular body 51 has an inner annular surface 511, an outer annular surface 512, a first lateral surface 513, and a second lateral 514 on which four debris exits 52 are equiangularly provided. Each debris exit 52 is in communication with the spiral passage 16 through four circular pores 54 penetrating through the first lateral surface 513. Referring to FIG. 11, when a fluid flowing along the spiral passage 16 reaches the dustproof device 50, the pressure of the fluid can push and expand all the circular pores 54, allowing debris to flow out of the debris exits 52 with the fluid through the circular pores 54, whose diameters are now increased. Once the fluid pressure is removed, the walls of the circular pores 54 contract due to the elasticity of the material of the dustproof device 50 and thereby restore the circular pores 54 to their original diameters. As shown in FIG. 10, the circular pores 54 that are communicated with one debris exit 52 of the dustproof device 50 are radially arranged. However, the present invention is not limited to this design. For example, referring to FIG. 12 to FIG. 14, each debris exit 62 of the dustproof device 60 is communicated with one cross-shaped pore 64. The cross-shaped pores 64 can be pushed and expanded by the pressure of a fluid to enable discharge of debris through the debris exits 62. When the pressure of the fluid is removed, the cross-shaped pores 64 resume their original shapes.

It is worth mentioning that as shown in FIGS. 9-11, the annular body 51 is composed of a plate member 515 formed with the four debris exits 52, and four block members 516 each provided with the circular pores 54 and coupled with the plate member 515 inside the debris exits 52 of the plate member 515. With this design, when the circular pores 54 of one or more block members 516 are damaged, the annular body 51 can be repaired by replacing the damaged block members 516 with new ones. Further, the plate member 515 can be made of a first material and the block members 516 can be made of a second material different from the first material so as to fulfill different use requirements.

According to the above, the dustproof device of the present invention not only provides a good sealing effect, but also features a simpler structure and can discharge the debris in the gap between the screw rod and the nut of a ball screw more effectively than its prior art counterparts to extend the service life of the ball screw.

What is claimed is:

1. A dustproof device for a ball screw, wherein the ball screw comprises a screw rod and a nut mounted around the screw rod, the screw rod has a periphery provided with an external spiral groove, the nut has an inner periphery provided with an internal spiral groove, and the external spiral groove of the screw rod and the internal spiral groove of the nut correspond to each other and jointly form a spiral passage, the dustproof device comprising:

an annular body disposed inside the nut and penetrated by the screw rod, the annular body having an inner annular surface provided with a dustproof lip abutting against the periphery of the screw rod, an outer annular surface provided with at least one debris exit, a first lateral surface, and a second lateral surface, the at least one debris exit being communicated with the first lateral surface to form a first opening and communicated with the second lateral surface to form a second opening, the at least one debris exit being communicated with the spiral passage via the first opening; and at least one elastic valve plate, which is connected to the annular body and completely blocks over the second opening;

wherein the at least one elastic valve plate has an end connected to the inner annular surface of the annular body, and an opposite end extending in a direction away from the dustproof lip and abutting against the nut.

2. The dustproof device of claim 1, wherein the inner periphery of the nut has at least one valve plate groove in which the at least one elastic valve plate is located, and the at least one elastic valve plate is connected to the outer annular surface of the annular body.

\* \* \* \* \*